United States Patent [19]

Brynielsson et al.

[11] Patent Number: 4,536,004
[45] Date of Patent: Aug. 20, 1985

[54] MOVABLE FOOT-STEP FOR A VEHICLE

[75] Inventors: Thore Brynielsson, Borgholm; Tom Tomasson, Löttorp; Leif Ahlberg; Magnus Johansson, both of Gothenburg, all of Sweden

[73] Assignee: Ab Thoreb, Borgholm, Sweden

[21] Appl. No.: 400,116

[22] Filed: Jul. 19, 1982

[30] Foreign Application Priority Data

Aug. 3, 1981 [SE] Sweden ................................. 8104651

[51] Int. Cl.³ ............................................. B60R 3/02
[52] U.S. Cl. .................................... 280/166; 105/436; 182/88
[58] Field of Search ...................... 280/166, 163, 169; 105/449, 447, 443, 436, 425, 432, 433; 182/88, 228

[56] References Cited

U.S. PATENT DOCUMENTS 4,020,920 5/1977 Abbott ................................. 105/447
4,185,849 1/1980 Jaeger ................................. 280/166

Primary Examiner—Joseph F. Peters, Jr.
Assistant Examiner—Joseph G. McCarthy
Attorney, Agent, or Firm—Holman & Stern

[57] ABSTRACT

A movable foot-step for a vehicle is operable by a mechanism including a guide device below the floor of the vehicle for extension of the step outside one side of the vehicle in an outwards/downwards movement and retraction in the opposite direction. The foot-step comprises a support structure over which an endless mat is stretched, and means for retaining a portion of the mat in the direction of movement of the foot-step, but not in the vertical direction.

11 Claims, 6 Drawing Figures

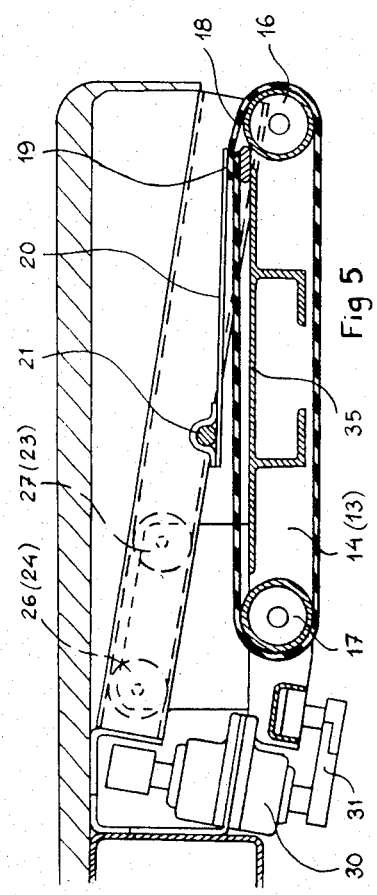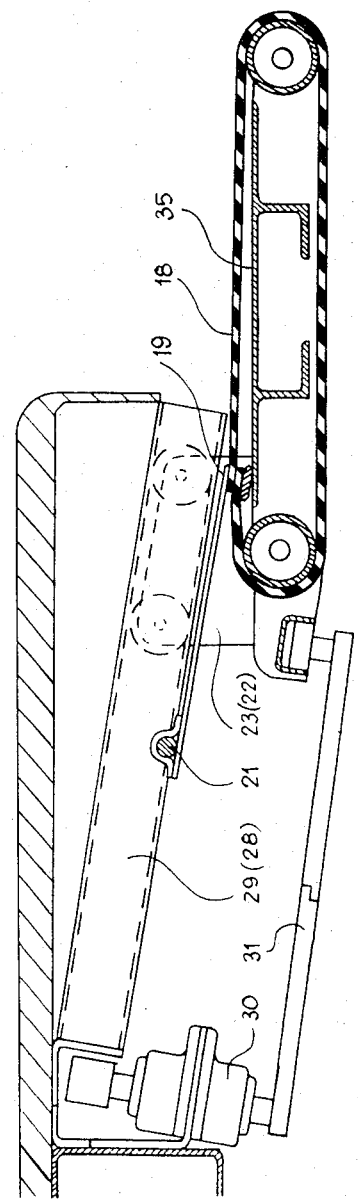

MOVABLE FOOT-STEP FOR A VEHICLE

BACKGROUND OF THE INVENTION

1. Field of the Invention

The present invention relates to a movable foot-step for a vehicle, such as a bus for example. 2. Description of the Prior Art In most passenger transport vehicles the vehicle floor is located at a considerable higher level than the ground plane, and it is necessary to arrange one or several steps for making embarking and debarking possible.

Transportation companies desire, on one hand, a first step as low as possible for facilitating embarking and debarking. On the other hand, it is desirable, especially at the front doors of buses, that there is a good ground clearance for reducing the risk of the front corner of the bus hitting the ground and being damaged. This risk is especially high when the front of the bus sweeps in over a pavement when slowing down at a bus stop.

The difference in level between the ground and the first step of the bus is pronounced still more if the embarking has to be carried out from the street level instead of from the pavement, when, for example, the driver is unable to stop the bus close to the pavement due to a wrongly parked car.

An extensible foot-step on a vehicle, which when extended also is lowered, makes it possible to achieve clear advantages such as the following:

A low first step having an improved ground clearance.
When it is used on buses the step will be extended towards the pavement, meaning firstly that the risk is reduced that the passengers first have to step down onto the street before they enter the bus, and secondly meaning that it is not necessary to drive close to the pavement which reduces the risk of damaging the tires against the pavement edges.
Lower step heights, less steep ladder inclination and larger tread plates are obtained since one of the steps will be located outside the vehicle.
In vehicles having a very low floor height there are not needed any fixed steps in the vehicle, meaning that the floor of the vehicle will be planar the whole way up to the doors.

For many years there have been suggested several solutions of the movable step concept where the steps are extended when embarking and debarking, but frequently the structures have been very complex from a mechanical point of view or have operated unsatisfactorily and frequently also caused injuries to passengers.

BRIEF SUMMARY OF THE INVENTION

The object of the present invention is to provide a movable step suited for being used in vehicles of different types, the step having the advantages mentioned above and being reliable in operation and simple so that risk of injuries to persons generally is eliminated.

A foot-step according to the invention basically is operable by a mechanism including a guide device below the floor of the vehicle for extension of the step outside one side of the vehicle in an outwardly/downwardly going movement, and retraction in the opposite direction. The distinguishing feature is that the foot-step includes a support structure over which an endless belt is stretched and means for limiting the freedom of movement of one portion of the mat in the direction of movement of the foot-step but not in the vertical direction.

The relative movement between the mat and the support structure may also be described as a relative movement between mat and support structure such that the "foot-step part" of the mat is diminishing by describing a movement having no substantial component of movement in the retraction direction of the foot-step. Within the basic concept is also included the possibility of giving the mat a net component in the extension direction when retracting the foot-step.

In one embodiment, the support structure includes two parallel rollers over which the mat is stretched.

The means for retaining a portion of the mat preferably is such that is prevents the upper face of the mat during the upwards/downwards movement and inwards/upwards movement, respectively, from moving.

The retaining means preferably comprises a shaft attached to the vehicle and one or several arms at one end thereof journalled to the shaft and at the other end attached to the mat. Alternatively, the means may comprise a cross bar being fixed to the mat portion and provided with anti friction means, for instance wheels at the ends thereof, the anti friction means running into vertical guides on each side of the mat.

The guide device preferably comprises parallel profile bars arranged inclined relative the horizontal plane, and each cooperating with a carriage having at least two wheels or sliding elements. The guide device preferably comprises two or more link arms, the ends of which the entire time during the outwards or inwards movement move in or parallel to the plane of extension, and are journalled such that they are able to transfer to the vehicle the forces on the support construction.

The support structure preferably comprises a tread plate connecting the support structure to right angled sides of the rollers and located immediately under the upper part of the mat.

BRIEF DESCRIPTION OF THE DRAWINGS

The invention will now be described in detail with reference to the accompanying drawings wherein:

FIG. 5 is a vertical cross-sectional view of the embodiment according to FIG. 4 in a retracted position; and FIG. 6 is a view similar to FIG. 5 but showing the step in an extended position.

DETAILED DESCRIPTION

Figure 1:
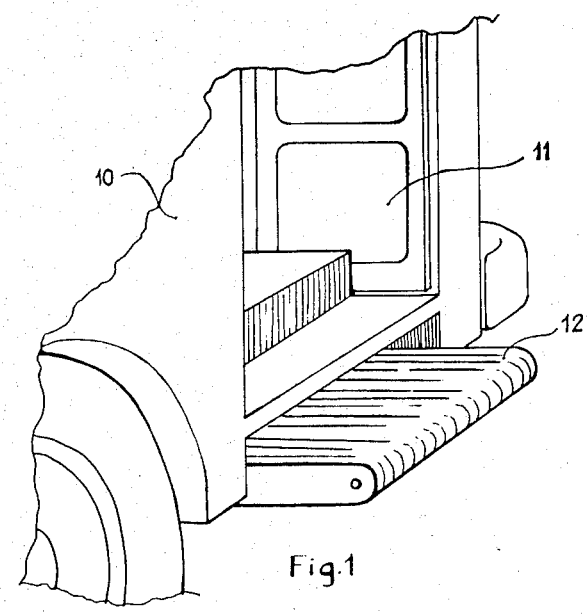
FIG. 1 is a perspective view showing the front portion of a vehicle having a movable step according to the invention in an extended position.

In FIG. 1 10 denotes a vehicle of an arbitrary type having a passenger door 11. A movable step 12 is here shown in an extended position.

Figure 2:
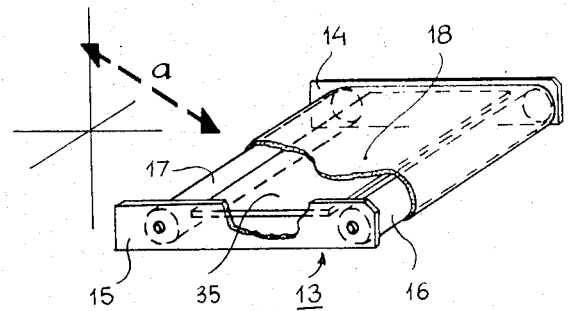
FIG. 2 is a schematic perspective view showing the support structure comprising rolls and the endless mat.

In FIG. 2 there is shown a support structure 13 having two parallel side pieces 14 and 15. In said pieces there are supported two rollers 16, 17, over which an endless mat/belt is tensioned. Said elements form the step proper which when extended is guided by a guide device below the floor of the vehicle in an outwardly/downwardly directed movement a.

In the rest of the figures there is shown a movable foot-step, but it is realized that there could be two or several movable foot-steps at different levels and operating in the manner which will be described below, as well as other support structures than rollers.

Figure 3:
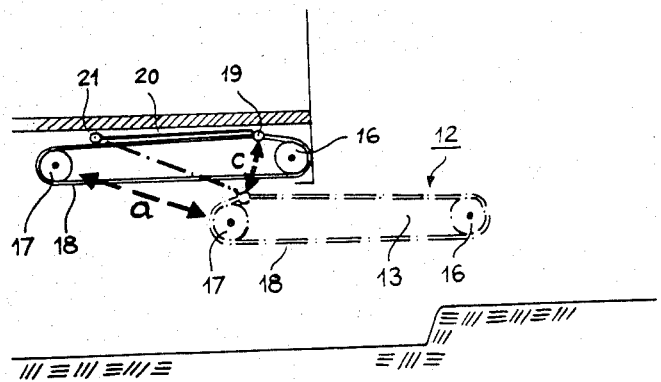
FIG. 3 is a schematic elevational view of the movable step in a retracted and extended position.

In FIG. 3 the foot-step 12 is shown schematically in retracted and extended, respectively, positions. An essential feature of the invention is that a portion 19 of the mat 18 is retained fixed or strictly limited from movement in the lateral direction of the vehicle, at least in the retraction direction of the foot-step, but not in the height direction, meaning that the support structure when extending or retracting the step 12 is given a relative motion c maintaining the mat in a horizontal position and giving the mat no substantial component of movement in the retraction direction of the step. When retraction is performed, the mat 18 is rolled around the rollers 16, 17, but the "foot-step part" proper of the mat thereof does not move in the retraction direction. (However, a component of movement in the "extension" direction might be arranged, for instance for quicker reduction of the "foot-step part" of the mat.) If for instance an object is placed on the step and the step is retracted, the object is maintained unmoved on the mat and is raised somewhat the whole time. The roller 16 is approaching more and more that portion of the mat where the object is located and when said portion of the mat is turned around the roller 16 the object falls down on the ground. The portion of the step 12 which is contacting the feet of the passengers, i.e. the mat 18, does not move inwards when the step is retracted. This is of importance from a safety point of view but also from a reliability point of view since no dirt or similar material reaching the step will be drawn into the guide device for example when the step is retracted.

The portion 19 of the mat 18, preferably being that region where the mat is connected to the endless belt, is fixed by an arm 20, for example which is journalled for swinging on a lateral shaft 21 fixed below the floor of the vehicle. When extending and retracting the step 12 the portion 19 moves in a circular path c.

Figure 4:
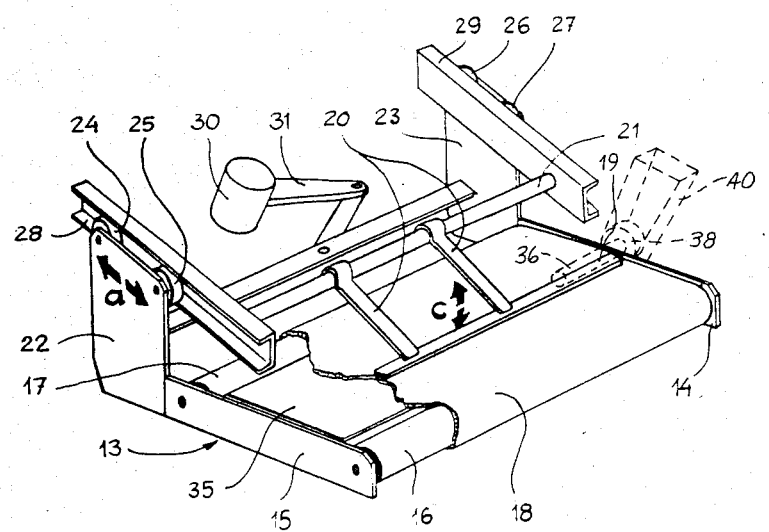
FIG. 4 is a schematic perspective view showing the different parts of the movable step in one of the embodiments.

An alternative of maintaining the portion 19 fixed laterally relative to the vehicle but not in the height direction, as shown in dashed lines in FIG. 4, is to fix a lateral rod 36 on the portion 19, which then also is used for interconnecting the mat to rollers or wheels, 38 at the ends of the rod, only one being shown. Said rollers run in substantially vertical guides 40 at either side of the mat, whereby the portion 19 is fixed laterally on the vehicle but not in the height direction.

The guide device may be performed in several ways, and may for instance comprise two or more link arms, the ends of which the entire time during the outward or inward movement move in or parallel to the plane of extension. The link arms are journalled such that they are able to transfer the forces to the vehicle that arise when the passengers climb the step 12. In the embodiment of the invention disclosed below, the guide device comprises an arrangement of guides.

The member for obtaining the outwards and inwards movement of the support structure may be shaped in many ways for instance by combining linear or turning cylinders or motors, when needed supplemented by one or several link arms.

The member may also be shaped as a chain/wire, belt transmission. In the embodiment of the invention disclosed below, the member comprises a cylinder acting on to the support structure via a link arm.

The support structure preferably comprises a tread plate 35 connected at its ends perpendicularly to side pieces 14, 15 in which rollers 16, 17 are journalled and is located immediately below the upper part of the mat.

An embodiment of the invention according to the general principle above will now be described by reference to FIGS. 4, 5 and 6.

FIG. 4 schematically shows the main components of the system comprising a support structure 13 having two parallel side plates 14, 15. In said plates there are supported two rollers 16, 17 over which an endless mat 18 is stretched.

To each side plate 14, 15 there is fixed a carriage 22, 23. The carriages are provided with two wheels, 24, 25 denoting the wheels of the carriage 22 and 26, 27 denoting the wheels of the carriage 23. The wheels run in channel-shaped guides 28, 29 fixed to the vehicle and arranged such that they are inclined relative to the horizontal plane so that the support structure 13 is guided in an outwards/downwards movement and inwards/upwards movement, respectively. For displacing the support structure there is used equipment (members) of a known type, here illustrated as pressurized air rotating motor 30 which operates the support structure via a knee link arm 31. As far as the space allows it is possible to use linear servo motors, air cylinders, or chain mechanisms, for example.

An essential feature of the invention is as mentioned that a portion 19 of the mat 18 is retained as defined, at least during the retraction of the step. Since the step is lowered when being extended and raised when retracted this is arranged, for example, so that the portion 19 is retained by two arms 20 journalled for swinging on a lateral shaft 21 fixed to the vehicle, for example, permanently mounted between the guides 28, 29.

Between the two rollers 16, 17 there is a tread plate 35 located just below the upper part of the mat 18. The tread plate is rigidly connected to the side plates 14, 15 of the support structure and is the element that actually supports the weight of the person climbing the step.

Details appear more clearly from FIGS. 5 and 6, the first of which shows the step retracted below and bus floor and the latter showing the step extended/lowered.

It is apparent that the risk of being crushed, for a person standing on the step, is at a minimum since the upper part of the mat does not move inwardly when the step is retracted. On vehicle doors having opening/and closing automatic arrangements, there is preferably arranged a sensor adjacent to either of the carriages 22, 23, or the guides 28, 29, from a safety point of view for preventing activation of the motor 30 if the step is loaded. The signal from such a sensor may also be used as one of the control signals for the door automatic control of the vehicle, in combination with for instance signals from photo cells or similar devices.

Components may of course, within the scope of the accompanying claims, vary as to size and form depending on the type of vehicle on which the step is mounted.

What we claim is:

1. A movable foot-step for a vehicle, operable by a mechanism including a guide device below the floor of the vehicle for extension of the step outside one side of the vehicle in an outwardly/downwardly movement, and retraction in an opposite inwardly/upwardly movement, comprising: a support structure over which an endless mat is stretched with an upper part extending substantially horizontally; and means for limiting the freedom of movement of one portion of the mat to facilitate upward movement of said portion, while substantially retaining said portion against movement in one direction of movement of the foot-step.

2. The foot-step as claimed in claim 1, wherein said means for retaining said portion of the mat prevents said portion of the mat, at least during the inwards/upwards movement, from moving horizontally.

3. The foot-step as claimed in claim 2, wherein said support structure comprises two parallel rollers over which the mat is stretched.

4. The foot-step as claimed in claim 3 wherein the support structure further comprises two spaced side plates, said rollers being rotatably mounted at their ends in said side plates, and a planar tread below said upper part of said mat extending between and connected at its ends to said side plates.

5. The foot-step as claimed in claim 3 wherein said means for retaining a portion of the mat further comprises a bar extending substantially parallel to said rollers and attached to the mat, and means for laterally guiding said bar with respect to the vehicle.

6. The foot-step as claimed in claim 2, wherein said means for retaining a portion of the mat comprises; a shaft fixed to the vehicle, and at least one arm journalled at one end to said shaft and attached at the other end to said portion of the mat.

7. The foot-step as claimed in claim 2, wherein said means for retaining a portion of the mat comprises a lateral rod attached to said mat portion, anti-friction wheels mounted at the ends of said rod, and substantially vertical channel guides mounted on the vehicle at either side of the mat, said wheels operatively engaging in said channel guides.

8. The foot-step as claimed in claim 7, wherein said guides comprise inwardly-facing channel-shaped beams mounted on the sides of an entrance well of the vehicle.

9. The foot-step as claimed in claims 1 or 2, wherein the guide comprises two parallel channel bars mounted on the vehicle inclined relative to the horizontal plane, and said support structure comprises a carriage having at least two anti-friction wheels mounted thereon and operatively engaging in said channel bars.

10. The foot-step as claimed in claim 7, wherein said carriage comprises at least two arms the ends of which during the movement outwards or inwards move in or parallel to the plane of extension, and are journalled by said wheels so that they transfer to the vehicle the forces on said carriage.

11. The foot-step as claimed in claim 2 and further comprising a motor means mounted on said vehicle, and a pivotable link mechanism operatively connected to said support structure and to said motor means so that said motor means moves said support structure when actuated.

* * * * *